April 17, 1956 D. W. WEBER 2,742,618

PHASING AND MAGNITUDE ADJUSTING CIRCUIT

Filed Dec. 29, 1951

INVENTOR.
DAVID W. WEBER
BY Marvin Moody
ATTORNEY 2,742,618

PHASING AND MAGNITUDE ADJUSTING CIRCUIT

David W. Weber, Cedar Rapids, Iowa, assignor to Collins Radio Company, Cedar Rapids, Iowa, a corporation of Iowa Application December 29, 1951, Serial No. 264,043

1 Claim. (Cl. 333—17)

Figure 1:
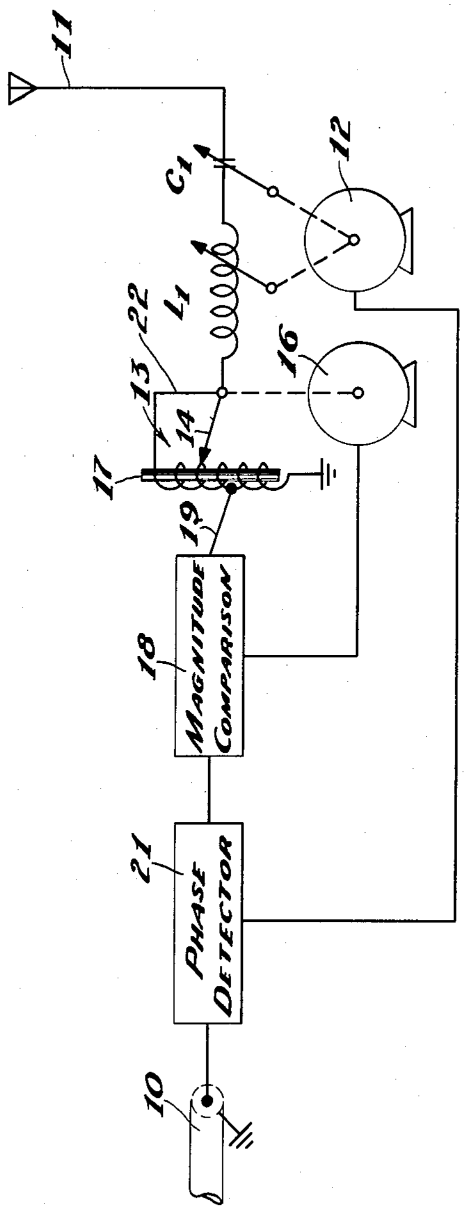

This invention relates in general to a balancing network and in particular to means for maintaining a fixed phase and amplitude relationship between input and output impedance.

In electronics it is oftentimes desirable to connect a first circuit to a second circuit which has a constant input impedance. In order to do this most efficiently it is desirable to convert the magnitude and phase relationship of impedance of the first circuit so that it is balanced with the second circuit. For example, when a radio receiver is connected to an antenna it is desirable to have no reflection or mismatch.

It is an object of this invention therefore to provide phase and magnitude adjusting means for a circuit so that it may be connected to a second circuit.

Another object of this invention is to provide automatic phase and magnitude controlling means.

Further objects, features and advantages of this invention will become apparent from the following description and claim when read in view of the drawing in which:

The figure is a schematic illustration of the automatic tuning apparatus of this invention.

The figure illustrates a coaxial cable designated generally as 10 to which it is desired to connect suitable electrical apparatus. The conductor 10 might be connected, for example, to a radio transmitter to which it is desired to connect an antenna 11. The conductor 10 might be, for example, a 50 ohm line.

An inductance $L_1$ and a capacitor $C_1$ are connected in series with the antenna 11 and a motor 12 is connected to vary them so as to adjust the phase angle of the circuit.

An autotransformer 13 is engaged by a movable contact 14 which is connected to one end of the inductance $L_1$. A second driving means 16 is connected to the contact 14. The driving means 16 receives an input from a magnitude comparison circuit 18 which is connected by a lead 19 to the transformer 13. The transformer 13 might have a suitable iron core 17. A shorting wire 22 may be connected from the end of the autotransformer coil to the contact 14. This prevents self-resonance in some applications. The motor 12 receives an electrical input from a phase detector 21 which is connected between the coaxial cable 10 and the magnitude comparison circuit 18.

The phase detector 21 and the magnitude comparison circuit 18 may be of any well known type. For an example of circuits that may be used reference may be made to the Patent No. 2,691,132 to John Sherwood et al., filed June 7, 1950, entitled Magnitude and Phase Meter.

In operation, when the coaxial line 10 is connected to the circuits shown in the figure, the phase detector 21 and magnitude comparison circuit 18 will produce outputs if any unbalance exists. The phase detector 21 will produce an output that drives motor 12 until the inductance $L_1$ and capacitance $C_1$ are adjusted until zero output is received from the phase detector 21. Simultaneously, the magnitude comparison circuit 18 furnishes an output to the motor 16 which varies the contact 14 until the impedance looking into line 19 is equal to the impedance of conductor 10.

A particular advantage of this circuit is that it is able to sense at a low impedance point rather than on the high impedance side of the transformer 13. It also corrects for any leakage reactance in the transformer 13 in that the phase detector and magnitude comparison circuits are connected between the line 10 and the transformer 13.

The circuit has no ambiguous points and the adjustments of phase and magnitude are substantially independent.

Another advantage of this circuit is that the magnitude controlling element is capable of transforming impedance both upward and downward with resultant simplification of other elements of the circuit.

Although this invention has been described with respect to a particular embodiment thereof, it is not to be so limited as changes and modifications may be made therein which are within the full intended scope of the invention as defined by the appended claim.

I claim:

Means for tuning an antenna and matching its impedance to the output circuit of a transmitter, comprising an autotransformer having one end connected to ground, said autotransformer having a fixed tap and an adjustable tap to provide a variable transformation ratio between said fixed and adjustable taps, a variable inductor, a variable capacitor connected in series with said variable inductor between said antenna and said adjustable tap, shaft means connected to said capacitor and said inductor to vary them simultaneously, phase detector means for providing an output that varies with reactive current, magnitude comparison means for providing an output that varies with current magnitude, said phase detector means and said magnitude comparison means connected serially between the output of said transmitter and the fixed tap of said autotransformer, first driving means having an electrical input connected to the output of said magnitude comparison means and having an output shaft connected to the variable tap of said autotransformer to adjust it, second driving means having an electrical input connected to the output of said phase detector and having an output shaft connected to said inductor and said capacitor to vary them simultaneously, said variable tap adjusted by said magnitude comparison means to provide maximum transmitter current, and said inductor and capacitor adjusted by said phase detector to obtain zero reactive currents in said transmitter output.

References Cited in the file of this patent

UNITED STATES PATENTS

| | | |
|---|---|---|
| 1,938,092 | Amy et al. | Dec. 5, 1933 |
| 2,376,667 | Cunningham et al. | May 22, 1945 |
| 2,415,799 | Reifel et al. | Feb. 11, 1947 |
| 2,449,174 | O'Brien | Sept. 14, 1948 |
| 2,470,443 | Mittelmann | May 17, 1949 |
| 2,498,078 | Harrison | Feb. 21, 1950 |
| 2,523,791 | Vahle et al. | Sept. 26, 1950 |
| 2,593,361 | Sziklai | Apr. 15, 1952 |
| 2,609,510 | Wilmotte | Sept. 2, 1952 |
| 2,657,362 | Epperson | Oct. 27, 1953 |
| 2,691,132 | Sherwood et al. | Oct. 5, 1954 |